T. PATIN.

ROLLER BIT.

APPLICATION FILED MAY 14, 1921.

Reissued Sept. 13, 1921. 15,194.

INVENTOR.

Thaddeus Patin

BY Nesbitt and Wallace

ATTORNEYS.

UNITED STATES PATENT OFFICE.

THADDEUS PATIN, OF BREA, CALIFORNIA.

ROLLER-BIT.

15,194. Specification of Reissued Letters Patent. Reissued Sept. 13, 1921.

Original No. 1,305,488, dated June 3, 1919, Serial No. 252,959, filed September 6, 1918. Application for reissue filed May 14, 1921. Serial No. 469,566.

*To all whom it may concern:*

Be it known that I, THADDEUS PATIN, a citizen of the United States, residing at Brea, in the county of Los Angeles, State of California, have invented new and useful Improvements in Roller-Bits, of which the following is a specification.

My invention relates to roller bits and consists of the novel features herein shown, described and claimed.

Figure 1:
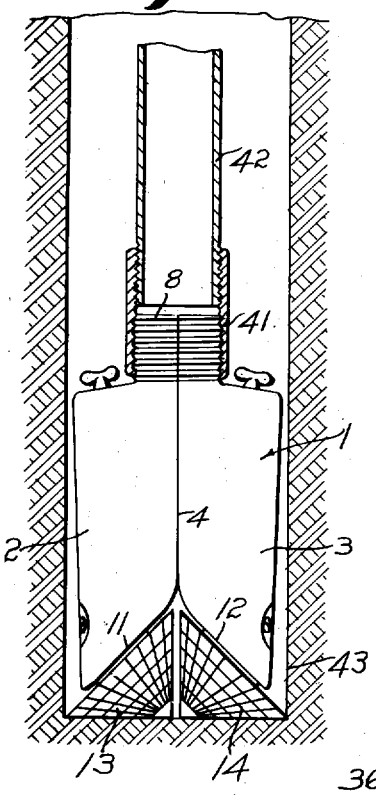
Figure 1 is a view showing the bottom of a well in section and showing a roller bit embodying the principles of my invention in operation, parts of the bit construction being shown in section.
Figure 2:
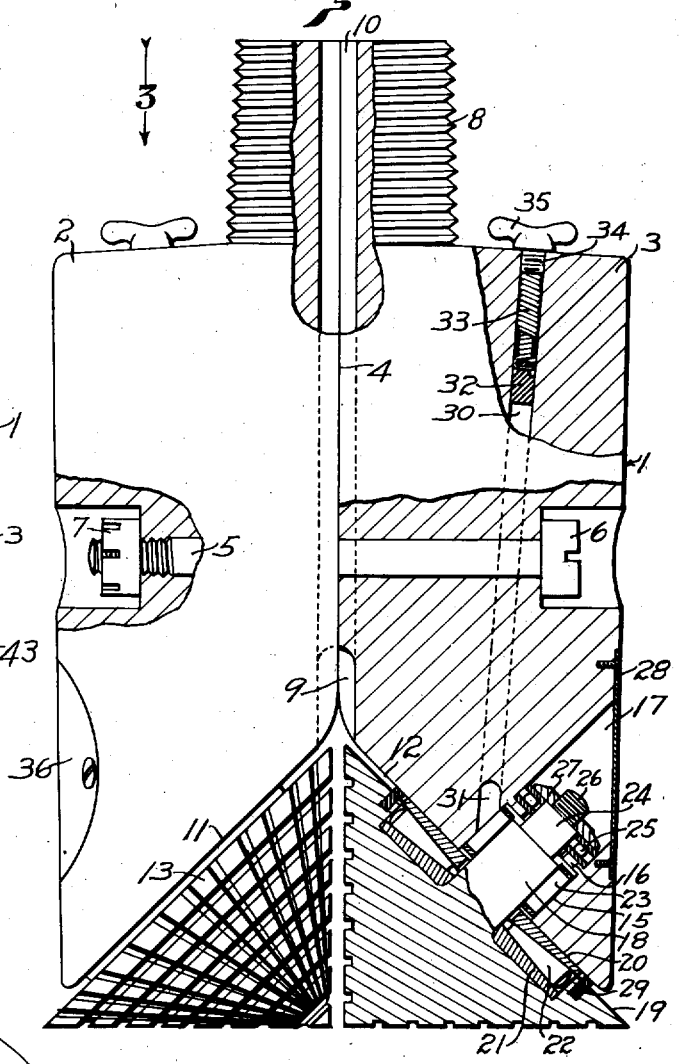
Fig. 2 is an enlarged elevation of the bit on the same plane as Fig. 1, parts being shown in section.
Figure 3:
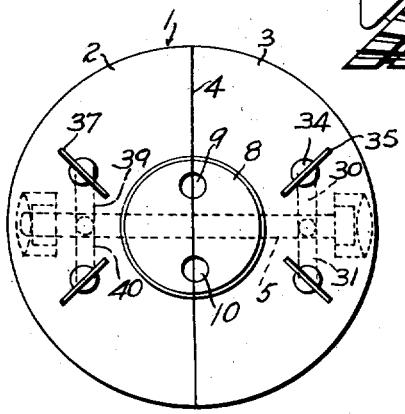
Fig. 3 is a top plan view looking in the direction indicated by the arrow 3 in Fig. 2.

The bit head 1 is formed of the parts 2 and 3 meeting on the diametrical vertical line 4 and secured together by the bolt 5 having a head 6 recessed into the side of the part 3, and a nut 7 recessed into the side of the part 2, the body of the bolt passing diametrically through the parts 2 and 3 on a line at right angles to the line 4. The bit head 1 thus constructed is circular in plan and slightly tapered from top to bottom. A screw threaded nipple 8 extends upwardly from the center of the head 1, and water holes 9 and 10 extend downwardly from the upper face of the nipple 8 to the bottom of the head. The lower face 11 of the part 2 is flat and extends from the lower end of the line 4 downwardly and outwardly at an angle of 45°, and the lower face 12 of the part 3 is identical with the face 11. The cutting cone 13 fits against the face 11, and the cutting cone 14 fits against the face 12, said cones 13 and 14 being right angle triangles in cross section. A bearing opening 15 is formed from the face 12 to the flange 16, and a bearing opening 17 is formed from the periphery of the part 3 to the flange 16. The stem 18 extends from the axial center of the flat face 19 of the cutting cone 14. A bearing plate 20 fits against the face 12 and a similar bearing plate 21 is recessed into the face 19 and tapered bearing rollers 22 are placed between the plates 20 and 21. Bearing rollers 23 are placed in the bearing opening 15 around the stem 18. A pintle 24 extends through the flange 16. A ball bearing 25 is placed around the pintle 24 in the bearing opening 17. A screw threaded nipple 26 extends from the pintle 24 and a nut 27 is screwed upon the nipple 26 against the ball bearing construction 25. A housing plate 28 is fixed in position to cover the bearing opening 17, the plate 28 preferably being embedded into the periphery of the part 3, so as to make the head 1 smooth. An annular packing 29 of asbestos, or the like, is recessed into the cone 14 from the face 19 around the bearing plate 20 and rollers 23, and the packing bears against the face 12. Grease openings 30 and 31 are formed from the upper end of the part 3 downwardly to the bearing opening 15 and these openings are of considerable length and of considerable size to hold a considerable quantity of grease. The grease may be inserted downwardly into the openings 30 and 31 and pressed to flow around the stem 18 and pintle 24, and through the bearing plate 20 to the rollers 22, the opening through the bearing plate 20 being larger than the stem 18 to allow the grease to flow. Then plungers 32 are placed in the openings 30 and 31. Expansive coil springs 33 are attached to the plungers 32 and pressed downwardly into the openings against the plungers the plungers pressing against the grease, and plugs 34 are screwed into the upper ends of the openings against the springs, there being wing handles 35 upon the plugs 34. As the cutting cone operates the grease will work around the parts and out to the packing 29, and as the grease is used up the springs 33 will expand to force the plungers 32 downwardly against the grease and continue the supply until the openings 30 and 31 are empty.

In a like manner the cutting cone 13 is mounted with relation to the face 11 in the part 2, the housing plate 36 corresponding to the housing plate 28 and the wing handles 37 and 38 controlling plugs in the openings 39 and 40, said openings 39 and 40 corresponding to the openings 30 and 31.

A coupling 41 is screwed upon the nipple 8 and the pipe drill stem 42 is screwed into the upper end of the coupling 41. The drill stem 42 is rotated and operated by the machinery at the top of the well, so as to rotate the head 1 and cause the cutting cones 13 and 14 to cut the rock at the bottom of the hole 43.

The bit head 1 is slightly smaller than the well hole 43. The cuttting cones 13 and 14 will cut a hole slightly larger than the bit head 1, so that the water passing downwardly through the pipe stem 42 will pass through the holes 9 and 10 and wash the ground rock upwardly around the bit head 1 and upwardly around the pipe stem 42.

The roller bit thus constructed is simple to make and operate, easily taken to pieces for repair and reassembled and is strong and durable. The lubricating systems are well adapted to hold the grease, so that the bit will operate for a considerable length of time without a new supply of grease.

I consider the matter of forming the stems 18 integral with the cutting cones, and placing the roller bearings between the cutting cones and the flat faces of the bit head, and around the stems 18 of great importance.

Various changes may be made without departing from the spirit of my invention as claimed.

What I claim is:

1. In a roller bit, the combination of a cylindrical head having a plurality of angularly disposed inner flat faces, each having a bearing opening extending through the head and normal to said face, each of said openings, having its bore reduced in diameter intermediate its ends, a conical cutting roller for each face having a spindle extending into a bearing opening and through the portion of the bore of reduced diameter, locking means detachably mounted on the ends of said spindles to prevent withdrawal of the latter, a detachable external closure plate for each of said bearing openings flush with the cylindrical surface of the head, antifriction bearing means interposed between said head and each cutting roller to take the thrust of the latter, and a resilient closure ring interposed between each cutting roller and the flat face of said head to prevent leakage of lubricant, said head being provided with lubricant storage chambers freely communicating with each of said bearing openings.

2. In a roller bit, the combination of a head having an angularly disposed inner flat face and a circular outer face with a bearing opening extending through said head and normal to said flat face, said opening having a portion intermediate its ends reduced in diameter, a conical cutting roller having a spindle extending into said bearing opening and through said reduced portion, locking means mounted on the end of said spindle to prevent withdrawal of the latter, antifriction bearing means interposed between said locking means and the portion of the bore of reduced diameter, antifriction bearing means interposed between said spindle and the wall of the bore of said opening, an external closure plate for said bearing opening mounted on said head flush with the outer face, antifriction means interposed between said head and said cutting roller to take the thrust of the latter, and a resilient closure ring interposed between said cutting roller and said head to prevent leakage of lubricant, said head being provided with a lubricant storage chamber freely communicating with said opening.

3. In a roller bit, two half bit heads each having a flat inner face and a circular outer face, and an inclined flat lower face extending from the lower end of the flat face downwardly and outwardly to the circular outer face, there being a bearing opening formed from the inclined flat lower face, a bearing opening formed from the circular outer face in line with the first bearing opening, and a flange between the inner ends of the two bearing openings; a bearing plate fitting the inclined flat lower face; bearing rollers fitting the bearing plate; a cutting cone; a second bearing plate recessed into the cutting cone and fitting the bearing rollers; a stem extending from the axial center of the cutting cone through the bearing plates into the first bearing opening; bearing rollers around the stem; a pintle extending from the stem through the flange; a ball bearing upon the pintle in the second bearing opening against the flange; a nipple extending from the pintle; and a nut upon the nipple against the ball bearing.

4. In a roller bit, two half bit heads each having a flat inner face and a circular outer face, and an inclined flat lower face extending from the lower end of the flat face downwardly and outwardly to the circular outer face, there being a bearing opening formed from the inclined flat lower face, a bearing opening formed from the circular outer face in line with the first bearing opening, and a flange between the inner ends of the two bearing openings; a bearing plate fitting the inclined flat lower face; bearing rollers fitting the bearing plate, a cutting cone; a second bearing plate recessed into the cutting cone and fitting the bearing rollers; a stem extending from the axial center of the cutting cone through the bearing plates into the first bearing opening; bearing rollers around the stem; a pintle extending from the stem through the flange; a ball bearing upon the pintle in the second bearing opening against the flange; a nipple extending from the pintle; a nut upon the nipple against the ball bearing; the first bearing rollers being recessed into the cutting cone; and an annular packing recessed into the cutting cone around the bearing plates and engaging the inclined flat lower face.

In witness that I claim the foregoing, I have hereunto subscribed my name this 4th day of May, 1921.

THADDEUS PATIN.